(12) United States Patent
Arroubi

(10) Patent No.: US 6,414,284 B1
(45) Date of Patent: Jul. 2, 2002

(54) TEMPERATURE SENSOR AND ELECTRICAL HOUSEHOLD APPLIANCE COMPRISING SAME

(75) Inventor: Mustapha Arroubi, Villons les Buissons (FR)

(73) Assignee: Moulinex S.A., Cormelles le Royal (FR)

( * ) Notice: Subject to any disclaimer, the term of this patent is extended or adjusted under 35 U.S.C. 154(b) by 0 days.

(21) Appl. No.: 09/719,295

(22) PCT Filed: Jun. 4, 1999

(86) PCT No.: PCT/FR99/01327

§ 371 (c)(1),
(2), (4) Date: Dec. 11, 2000

(87) PCT Pub. No.: WO99/64830

PCT Pub. Date: Dec. 16, 1999

(30) Foreign Application Priority Data

Jun. 9, 1998 (FR) .............................. 98 07672

(51) Int. Cl.[7] .............................. H05B 1/02; H05B 6/50; G01J 5/00
(52) U.S. Cl. ...................... 219/497; 219/710; 219/711; 374/129; 374/149
(58) Field of Search ................................ 219/490, 494, 219/497, 502, 709, 710, 711, 715, 716; 374/121, 129, 131, 132, 133, 149

(56) References Cited

U.S. PATENT DOCUMENTS

| | | | | |
|---|---|---|---|---|
| 3,539,807 A | * | 11/1970 | Bickel | 374/129 |
| 4,433,923 A | * | 2/1984 | Rascati et al. | 374/112 |
| 4,579,461 A | * | 4/1986 | Rudolph | 374/9 |
| 4,764,025 A | * | 8/1988 | Jensen | 374/144 |
| 4,900,162 A | * | 2/1990 | Beckman et al. | 374/132 |
| 5,360,966 A | * | 11/1994 | Noda et al. | 219/710 |
| 5,490,728 A | * | 2/1996 | Schietinger et al. | 374/7 |
| 5,589,094 A | * | 12/1996 | Bu | 219/711 |
| 5,693,247 A | * | 12/1997 | Bu et al. | 219/711 |

FOREIGN PATENT DOCUMENTS

| | | |
|---|---|---|
| DE | 43 31 574 | 3/1995 |
| GB | 2 314 166 | 12/1997 |
| WO | WO 95/35643 | 12/1995 |

* cited by examiner

*Primary Examiner*—Sang Paik
(74) *Attorney, Agent, or Firm*—Young & Thompson

(57) ABSTRACT

A temperature sensor includes a semiconductor wafer (2) with a recess wherein is placed a sensitive element (3) which is heated in response to a target infrared radiation, and thermal insulating layer (16) provided between the sensitive element (3) and the wafer (2), a thermoelectric element (6) which generates a first electric signal (V1) representing the difference between the target temperature and a reference temperature, and a device sensing temperature by contact (5), transmitting a second signal (V2) representing the reference temperature. The sensor includes an electronic device for processing the signals (V1, V2) transmitted by the thermoelectric element (6) and the device sensing temperature by contact (5), this device consisting of component formed in the semiconductor wafer (2).

12 Claims, 5 Drawing Sheets

TEMPERATURE SENSOR AND ELECTRICAL HOUSEHOLD APPLIANCE COMPRISING SAME

BACKGROUND OF THE INVENTION

The invention relates to the field of infrared temperature detectors, and to the field of electric kitchen apparatus using such detectors.

In certain electric kitchen apparatus such as for example ovens, particularly microwave ovens, it is known to determine by means of a contactless temperature detector, the temperature of the foodstuff to be heated.

Such a temperature detector generally comprises a plate of semiconductor material having a recess in which is disposed a sensitive element which heats up in response to the infrared radiation of a target, a thermally insulating layer 16 disposed between said sensitive element and said plate, a thermal electric element which generates a first electrical signal representative of the difference between the temperature of the target and a reference temperature, and a device which detects temperature by contact, which emits a second signal representative of the reference temperature.

The electric signals emitted by this type of detector must be processed by an electronic circuit to be usable in a simple and reliable way, for example to carry out a command acting on the operation of the apparatus.

In known apparatus of this type provided with such a detector, there have been mounted electronic cards processing the signals emanating from the detector, the electronic processing circuits being physically disassociated from said detector.

Such an arrangement however has the drawback of increasing the cost of production of the apparatus, because of the number of components to be separately mounted, hence the time necessary for these operations and the cost of production of these components.

SUMMARY OF THE INVENTION

The invention provides a remedy to this drawback, and provides a temperature detector of the previously mentioned type, integrating at least one portion of the processing electronics.

To this end, the detector according to the invention comprises electronic processing means for the signals emitted by the thermal electric element and the device which detects temperature by contact, these means being constituted by components formed in said plate of semiconductor material.

Thus, such a detector can be adapted for several types of apparatus, for example an oven as mentioned above, a deep fat fryer, a toaster, providing a very much reduced electronic processing particular to each type of apparatus.

BRIEF DESCRIPTION OF THE DRAWINGS

Other characteristics and advantages of the invention will become apparent from the detailed description which follows, by way of non-limiting example, with reference to the accompanying drawings, in which.

DESCRIPTION OF THE PREFERRED EMBODIMENTS

Figure 1:
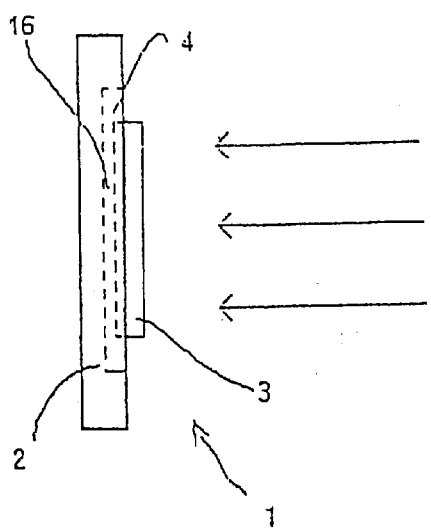
FIG. 1 is a schematic side view of a detector of known type.
Figure 2:
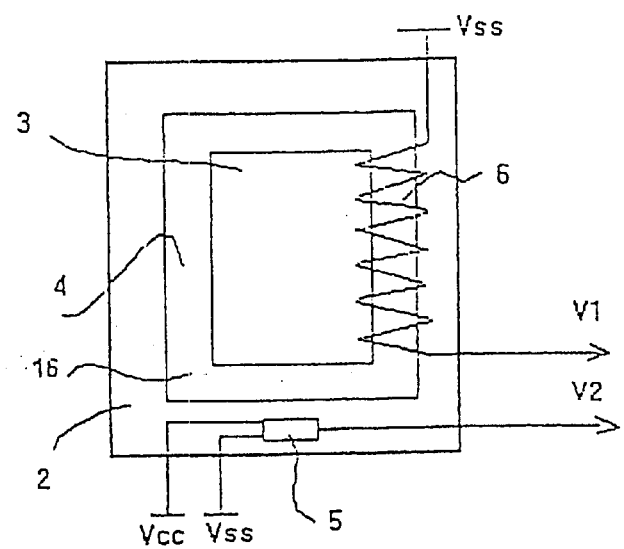
FIG. 2 is a schematic front view of this same detector.

As shown in FIGS. 1 and 2, the infrared detector 1 comprises a semiconductor material plate 2 forming a support, in which is provided a recess in which is disposed an element 3 sensitive to infrared radiation from a target. This element 3 is for example constituted by a plate containing bismuth, of which one principal characteristic is to heat sensitively in response to infrared radiation, according to a known law. A thermally insulating dielectric material 16 is disposed in the space separating the peripheral edge of the sensitive element 3 from the edge of the recess of the semiconductor plate 2. A thermo-electric element 6 of the thermocouple type, constituted by a series of electrical connections between so-called hot welds, integral with the sensitive element, and so-called cold welds, integral with the edge of the recess of the support, supplies an electrical signal V1 proportional to the temperature difference between the sensitive element 3 and the support 2. A device 5 which detects temperature by contact, disposed on the support 2, supplies an electrical signal V2 representative of the temperature of the support 2, influenced by the ambient temperature and by the radiation of various adjacent members. This temperature of the support constitutes a reference temperature. Such a device, known per se, constitutes a temperature detector generally sold under the name "thermopile with temperature compensation".

Figure 3:
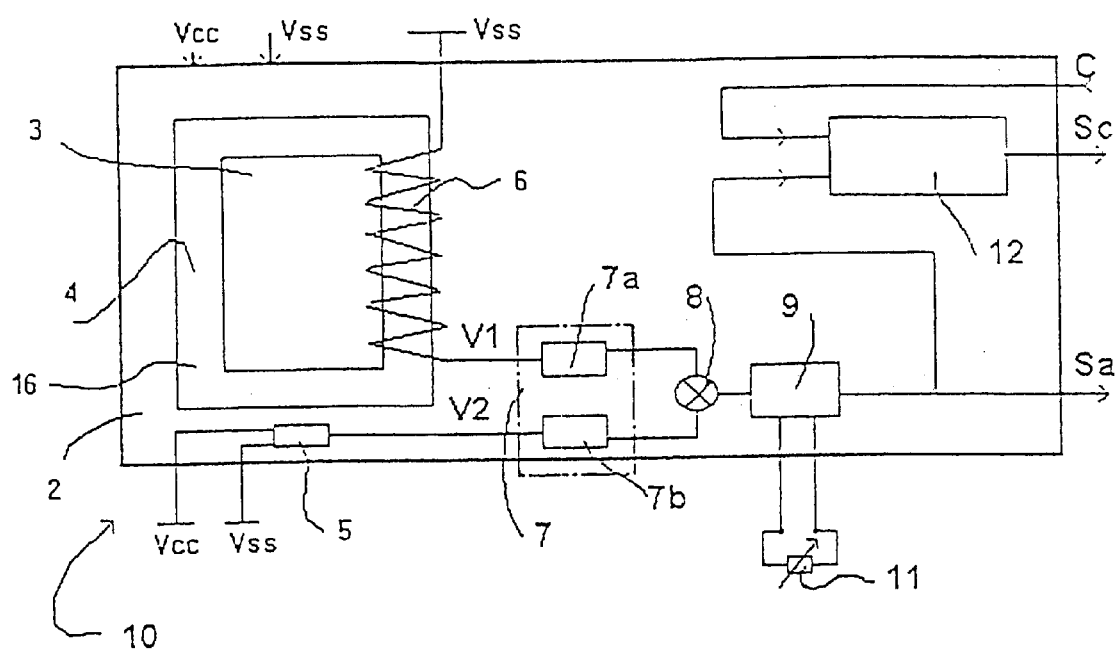
FIG. 3 is a schematic front view of a detector according to the invention.

According to the invention, and as shown in FIG. 3, the infrared temperature detector 10 comprises electronic processing means for the signals V1 and V2, emitted by the thermo-electric element 6 and the device 5 for detecting temperature by contact, these means being constituted by components formed in the plate of semiconductor material 2.

The processing means for the signals V1 and V2 comprise in particular an amplification state 7, constituted by a first amplifier 7a adapted to amplify the signal V1, and a second amplifier 7b adapted to amplify the signal V2, as well as a circuit 8 giving a signal representative of the temperature of the target, from first and second signals thus amplified. This circuit 8 is for example a summing circuit.

The processing means moreover comprise a second amplification stage 9, adapted to amplify the signal representative of the temperature of the target, whose gain is adjustable by means of a component 11, such as a variable resistance, external to the temperature detector, such that the operation of the detector will be easily adaptable to the different types of apparatus with which a detector according to the invention can be used. At the output of each amplification stage 9, the signal obtained constitutes an analog output signal Sa.

The processing means comprise, on the other hand, a comparator 12 receiving a reference signal of temperature C adjusted by the user, and the output signal Sa of the second amplification stage 9. The output signal Sc of the comparator 12, representative of the difference between the target temperature and the reference temperature, is used for controlling an electrical load and its supply, or for display.

Thanks to this arrangement, it will be understood that the various components comprising amplifiers, summers, being produced in the same plate of semiconductor material as the support of the sensitive element, are easily obtained by mass production, at reduced cost and with increased reliability.

Figure 4:
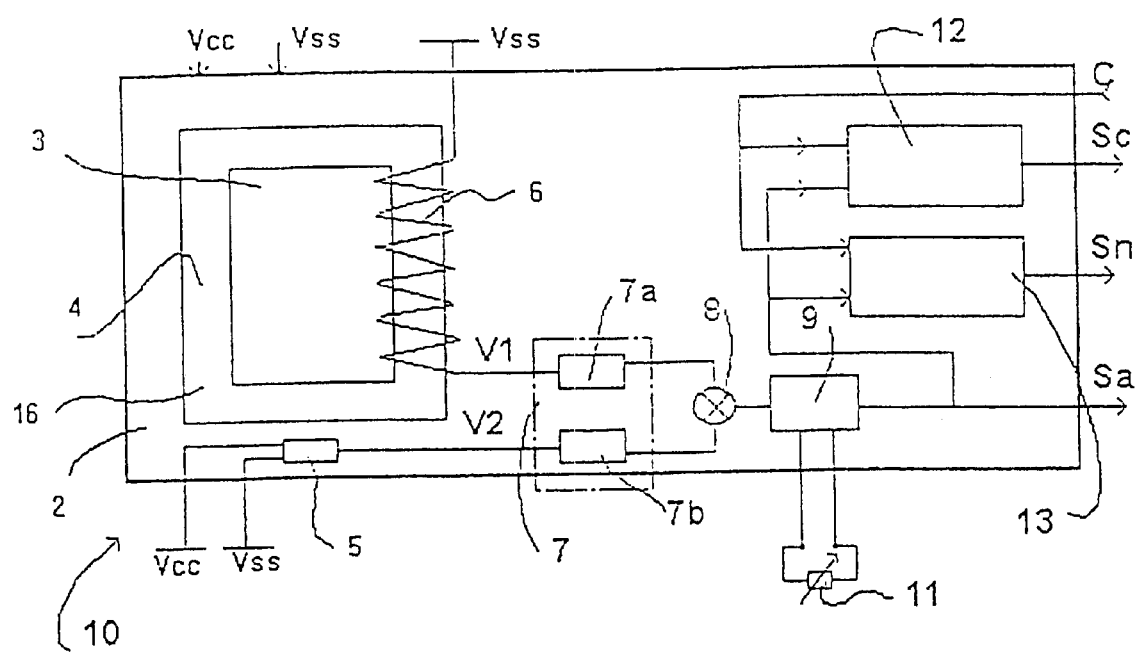
FIG. 4 is a schematic front view of a detector according to another embodiment of the invention.

According to a particular embodiment, as shown in FIG. 4, the processing means moreover comprise an analog/ digital converter 13, permitting converting alternatively the output signal Sa of the second amplification stage 9 and the reference signal C, into digital signals Sn which are transmitted to a microcontroller (not shown) external to the temperature detector, said microcontroller being adapted to control the electric and its supply, for example a heat source or a radiation source.

Figure 5:
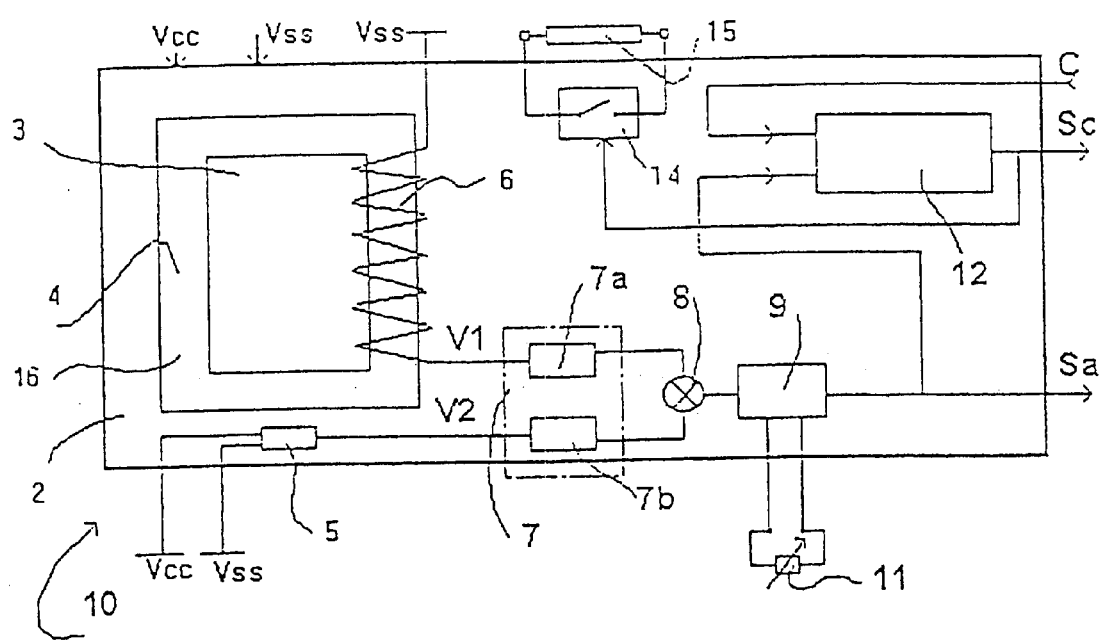
FIG. 5 is a schematic front view of a detector according to yet another embodiment of the invention.

Alternatively, as shown in FIG. 5, the processing means comprise an electronic switch 14 controlled by the output signal Sc of the comparator 12, also adapted to control an electrical load and its supply 15. This switch 14 is provided directly in the plate 2 of semiconductor material.

The electronic components used in the devices described above are for example obtained by processes of printing, serigraphy and/or electrolytic deposition applied to the plate of semiconductor material 2. They are supplied, as is shown schematically in the drawings, from a common source which delivers a continuous voltage, generally of 5 volts, between a neutral line Vss and a line at voltage Vcc.

A detector according to the invention, as described above, can preferably be used in an electric kitchen appliance.

Figure 6:
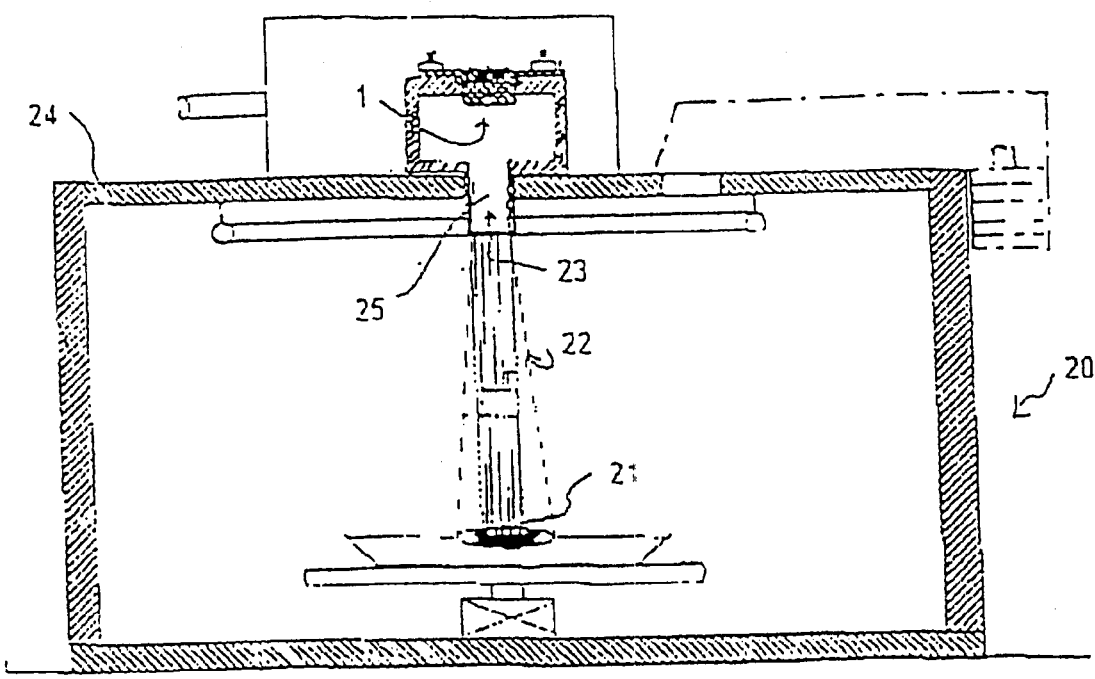
FIG. 6 is a schematic view of an oven comprising a detector according to the invention.

In particular, as shown in FIG. 6, an electric kitchen appliance using a detector of this type can be an oven 20, the detector 1 being arranged facing a hole 25 provided in the upper wall 24 of the cavity of the oven 20, with its sensitive element 3 located directly facing the target 21 to be observed. Radiation 22 emanating from the target 21 is processed by an optical device 23, such as a filter and a set of lenses, before striking the sensitive element 3.

Figure 7:
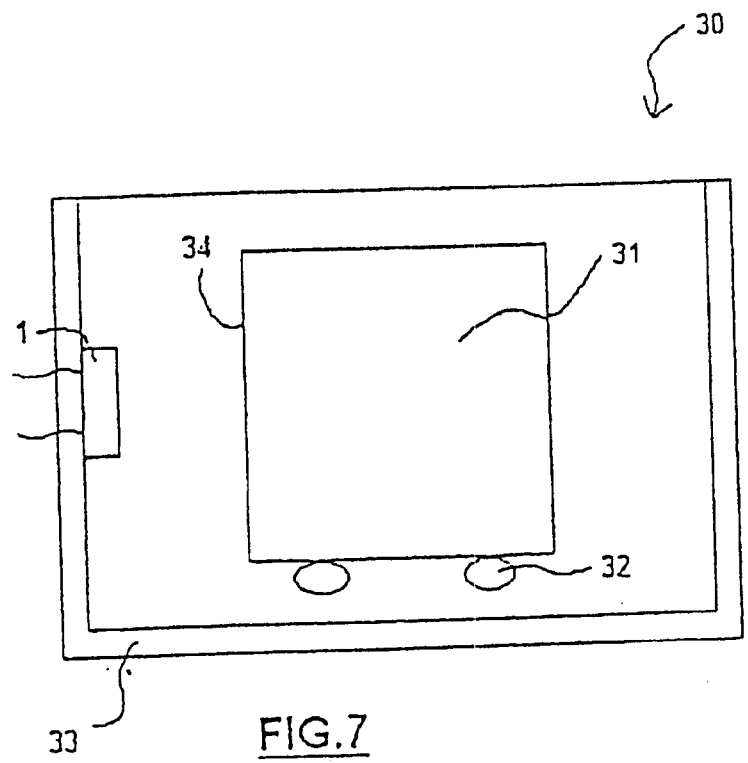
FIG. 7 is a schematic view of a deep fat fryer comprising a detector according to the invention.

Another electric kitchen appliance using a detector of this type can be, as shown in FIG. 7, a deep fat fryer 30, in which the detector 1 is arranged facing one of the external walls 34 of the cooking vat 31, said cooking vat 31 being disposed in an external housing 33, above an electric heating resistance 32.

Thanks to the provision of the components and the support of the sensitive element of the detector formed directly in the same plate, there is obtained a detector block of reduced size and which is antiparasitic, and which is easy to produce, which promotes its integration into electric kitchen appliances, wherein the saving of space is an important factor in the reduction of the cost of fabrication.

What is claimed is:

1. A temperature detector comprising:
   a plate (2) of semiconductor material having a recess in which is disposed a sensitive element (3) which heats up in response to infrared radiation from a target;
   a thermally insulating layer (16) disposed between said sensitive element (3) and said plate (2);
   a thermo-electric element (6) which generates a first electric signal (V1) representative of the difference between the temperature of the target and a reference temperature;
   a device (5) for detecting temperature by contact, which emits a second signal (V2) representative of the reference temperature; and
   electronic processing means for providing an output signal representative of a temperature of the target, said processing means receiving the signals (V1, V2) emitted by the thermo-electric element (6) and the device (5) for detecting temperature by contact, said processing means being constituted by components formed in said plate (2) of semiconductor material.

2. The temperature detector according to claim 1, wherein said electronic processing means for the signals (V1, V2) comprise a first amplification stage (7), adapted to amplify the first and second signals (V1, V2), and a circuit (8) giving a signal representative of the temperature of the target from the first and second amplified signals.

3. The temperature detector according to claim 2, wherein said electronic processing means further comprises a second amplification stage (9), adapted to amplify the signal representative of the temperature of the target.

4. The temperature detector according to claim 3, further comprising a gain control device (11) external to said plate (2) that adjusts a gain of the second amplification stage (9).

5. The temperature detector according to claim 3, wherein said electronic processing means further comprises a comparator (12) receiving a reference signal as to a temperature (C) regulated by the user, and an output signal (Sa) of the second amplification stage (9).

6. The temperature detector according to claim 5, wherein said electronic processing means further comprises an analog/digital converter (13) converting alternatively the output signal (Sa) of the second amplification stage (9) and the reference signal (C), into digital signals (Sn) which are transmitted to a microcontroller external to the temperature detector (10), said microcontroller being adapted to control an electrical load and its supply.

7. The temperature detector according to claim 5, wherein said electronic processing means further comprises an electronic switch (14) controlled by an output signal (Sc) of the comparator (12), and adapted to control an electrical load and its supply (15).

8. An electric kitchen apparatus comprising a temperature detector according to claim 1.

9. The electric kitchen apparatus according to claim 8, further comprising an oven (20) having walls (24) defining a cavity and wherein the temperature detector is arranged facing a hole (25) provided in one of the walls (24) of the cavity of the oven (20).

10. The electric kitchen apparatus according to claim 8, further comprising a deep fat fryer (30) having external walls (34) of a cooking vat (31) and wherein the temperature detector is arranged facing one of the external walls (34) of the cooking vat (31).

11. A temperature detector for detecting a temperature of a target, comprising a plate of semiconductor material in which are formed,
   a sensitive element that heats up in response to infrared radiation from a target,
   a thermoelectric element generating a first signal representative of a difference between a temperature of said sensitive element and a temperature of said plate,
   a contact element generating a second signal representative of the temperature of said plate, and
   an electronic circuit with components in said plate that amplify and combine said first and second signals and amplify the combined signals and provide an output signal representative of a temperature of the target.

12. The detector of claim 11, wherein said electronic circuit further comprises a comparator that receives an input from a user and said output signal and provides a third signal representative of a difference between the input from the user and said output signal.

* * * * *